Nov. 20, 1962   R. R. HAGER   3,064,429
BALL COMPENSATOR FOR HYDRAULIC SAFETY DIAPHRAGM
Filed March 21, 1960

INVENTOR.
ROBERT R. HAGER
BY
William P. Hickey
ATTORNEY

United States Patent Office 3,064,429
Patented Nov. 20, 1962

3,064,429
BALL COMPENSATOR FOR HYDRAULIC
SAFETY DIAPHRAGM
Robert R. Hager, South Bend, Ind., assignor to The
Bendix Corporation, a corporation of Delaware
Filed Mar. 21, 1960, Ser. No. 16,218
7 Claims. (Cl. 60—54.5)

The present invention relates to hydraulic braking systems of the type having a movable wall which mechanically separates fluid in the master cylinder portion of the system from the fluid in the portion in the system leading to a wheel cylinder; and more particularly to a ball compensator arrangement for such a system which is not only simple and rugged in its design but which will perform its compensating function in a positive and safe manner.

Prior art hydraulic braking systems with which I am familiar have employed safety devices having a pair of opposed chambers separated by means of a diaphragm for isolating the fluid of the master cylinder from the fluid which communicates with and actuates a wheel cylinder. It is the intended operation of such systems that fluid from the master cylinder will flex the diaphragm to force fluid out of the opposing chamber into the portion of the system leading to a wheel cylinder and thereby actuate the wheel cylinder. The volume of the opposing chambers is such as to be greater than the displacement of the wheel cylinder so that during normal operation the diaphragm never completely forces all of the fluid out of the opposing chamber connected to the wheel cylinder. When a rupture occurs in the portion of the system connected to the wheel cylinder, pressure from the master cylinder forces the diaphragm into engagement with the end wall of the opposing chamber leading to the wheel cylinder, and thereafter prevents further loss of fluid from the hydraulic system.

One of the difficulties of such systems is that a gradual leakage of fluid from the wheel cylinder gradually depletes the volume of fluid from the opposing chamber leading to the wheel cylinder; so that the diaphragm comes into engagement with the end wall of the opposing chamber leading to the wheel cylinder before enough fluid is displaced to the wheel cylinder to completely actuate its brake. This of course, may occur gradually and the operator will not be aware that the diaphragm is preventing him from achieving a complete brake application of the vehicle. These same prior art systems with which I am familiar have realized the necessity of providing compensation between the opposing chambers of the safety device in order to prevent this from happening; but they have no safe way of accomplishing this compensation automatically, and all have provided an innercommunicating passageway having at least one positive shut-off valve therein which must be operated manually. It will readily be seen that any compensating means which is used between the opposing chambers must be absolutely safe and reliable, otherwise the objective of the mechanical separation of the two portions of the system (which is the principal object of the device) is defeated.

It is the principal object of the present invention, to provide a new and improved automatic compensating means for such systems which is not only simple and inexpensive to manufacture, but which will be positive acting at all times and which does not employ parts that can fail and so endanger the braking system.

The invention resides in certain constructions and combinations and arrangements of parts; and further objects and advantages of the invention will become apparent to those skilled in the art to which the invention relates from the following description of the preferred embodiment described with reference to the accompanying drawing forming a part of this specification, and in which.

Figure 1:
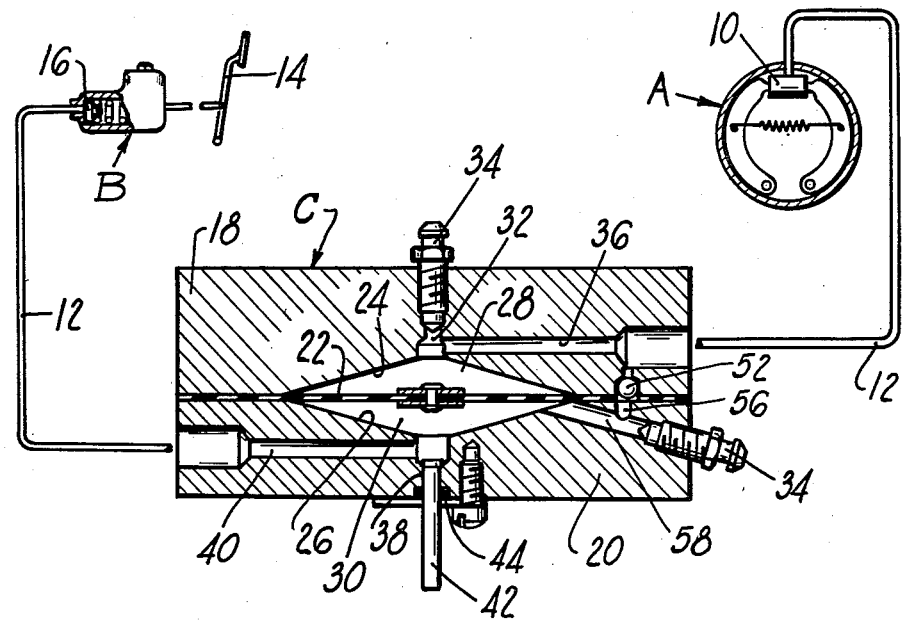
FIGURE 1 is a schematic view of an automotive hydraulic braking system employing principles of the present invention, and in which portions are broken away to better show their internal mechanism.
Figure 2:
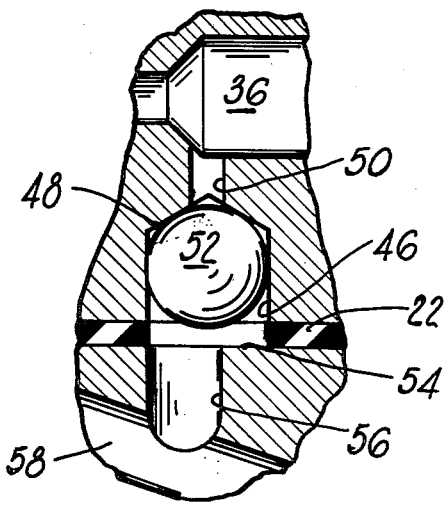
FIGURE 2 is an enlarged fragmentary cross sectional view of the portion of the structure shown in FIGURE 1.

The hydraulic braking system shown in FIGURE 1 generally comprises a brake assembly A having a brake applying hydraulic motor or wheel cylinder 10 that is supplied with fluid pressure from a conventional master cylinder B through an innercommmunicating line 12. Master cylinder B is operated by a foot pedal lever 14, and includes the conventional residual pressure check valve 16 in its outlet to prevent a too rapid return of hydraulic fluid from the wheel cylinder 10—which, due to its momentum, could draw air into the system past the seals of the wheel cylinder 10.

According to principles of the present invention, a safety device C is provided in the innercommunicating line 12 between the master cylnder B and the wheel cylinder 10 to mechanically isolate the portion of the system connected to the wheel cylinder 10 from the portion of the system connected to the master cylinder B. The safety device C has a housing made in two half sections 18 and 20 which are suitably bolted together with a neoprene diaphragm 22 sealingly clamped therebetween. Each of the housing sections 18 and 20 are provided with centrally located and generally conically shaped depressions 24 and 26 which form opposing chambers that are separated by the diaphragm 22. The volume of the opposing chambers 28 and 30 is substantially the same when the diaphragm 22 is in the centered position shown in the drawing; and each of their volumes is greater than that of the displacement of the wheel cylinder 10 by a predetermined amount—which in the preferred embodiment shown in the drawing, is approximately 5 percent greater than the displacement of the wheel cylinder 10. The outlet port for the upper opposing chamber 28 is formed by a vertical opening 32 the upper end of which is closed off by a conventional bleed screw, and a horizontal drilling 36 which connects the portion of the opening 32 below the bleed screw 34 with the portion of the line 12 leading to the wheel cylinder 10. The inlet connection for the lower opposing chamber 30 is formed by means of a vertical counterbored opening 38, and a horizontal passageway 40 which connects the large diameter portion of the opening 38 with the portion of the line 12 leading to the master cylinder B. A headed pin 42 is positioned in the counterbored opening 38 with its head positioned against the shoulder of the opening and with a suitable seal 44 positioned about the shaft of the pin, to provide an indicator which can be used to determine the position of the diaphragm 22.

According to further principles of the present invention, foolproof means are provided between the opposing chambers 28 and 30 which will permit the diaphragm 22 to slowly become centered during the released or at rest condition of the braking system. As previously pointed out, it is absolutely necessary that any compensating means which is so provided must postively close during each brake application; so that the entire braking system of the vehicle will not be disabled. This closing operation must be performed with substantially no loss in fluid from the opposing chamber 30 to the wheel cylinder 10. At the same time, the construction must be such that the compensating means will not stick or remain closed and thereby prevent the desired compensation or flow of fluid from the chamber 30 to the chamber 28 to replace the slow leakage which usually occurs from the wheel cylinder 10.

The structure which is provided generally comprises a drilling 46 having the usual conically shaped end 48, the center or apex of which is communicated by a small diameter drilling 50 to the horizontal outlet drilling 36. A ball bearing 52 is positioned in the drilling 46 for sealing abutment with its conical end 48, and the drilling 46 is sized just slightly larger than the diameter of the ball 52 so that the ball 52 is just free to move under its own weight in the drilling 46. The clearance which is provided will preferably be only a few thousandths of an inch; and in the preferred embodiment shown in the drawing, is approximately five thousandths of an inch. The amount of movement which the ball 52 can have is limited by the spacing of the conical end 48 from the end face 54 of the lower housing section 20; and this should preferably be kept to a small fraction of an inch in order to minimize the displacement of the ball 52 during its opening and closing operation. In the preferred embodiment shown in the drawing, this has been kept to approximately 0.015 inch. Communication of the opposing chamber 30 with the drilling 46 is provided by means of a small diameter bore 56 so positioned that the ball 52 cannot drop down into the opening of the bore 56 and thereby close it off; and it must be further arranged and constructed so that it only communicates with the portion of the ball 46 which lies below the center of the ball when the ball is in engagement with the surface 54. This prevents fluid from bypassing the sliding fit of the ball 52 in the chamber 46 when the ball 52 is in its lower position. In the preferred embodiment shown in the drawing, the drilling 56 is generally parallel with the drilling 46 but with its axis positioned eccentrically with respect to the axis of the bore 46—and as shown in the drawing has one side edge of the drilling 56 coextensive with one side edge of the drilling 46. The drilling 56 intersects a generally horizontal drilling 58 the inner end of which connects with the chamber 30 and the outer end of which is closed off by a conventional bleed screw 34. In the preferred arrangement, the drillings 46 and 56 are generally positioned vertically so that the weight of the ball 52 causes it to be moved toward its open position.

It will be seen that the objects heretofore enumerated as well as others have been accomplished; and that there has been provided a compensating means which is simple and rugged in its design, and which is foolproof in its operation. It will be seen that no springs which are subject to failure are used whose force need be overcome, and that the structure provided is uniquely adapted to perform the operation required with the safety and reliability that is necessary in hydraulic braking systems.

While the invention has been described in considerable detail, I do not wish to be limited to the particular constructions shown and described; and it is my intention to cover hereby all novel adaptations, modifications and arrangements thereof which come within the practice of those skilled in the art to which the invention relates.

I claim:

1. In a hydraulic braking system having a wheel cylinder which is supplied with fluid pressure from a fluid pressurizing device: a safety device having an internal chamber, a movable wall dividing said chamber into opposing chambers one of which has an inlet communicating with said fluid pressurizing device and the other of which has an outlet communicating with said wheel cylinder, said housing having a passageway therein communicating said opposing chambers, said passageway being formed by a large diameter bore having an end forming a valve seat the center of which has an opening communicating with said outlet, a ball in said bore substantially filling its cross section such that pressure flow from said inlet causes said ball to abut said seat and such that slow seepage past said ball occurs when the pressure at said inlet and outlet are substantially equalized, and a smaller diameter bore communicating the opposite end of said large diameter bore with said inlet in a manner which prevents said ball from closing off said smaller diameter bore.

2. In a hydraulic braking system having a wheel cylinder which is supplied with fluid pressure from a fluid pressurizing device: a safety device having an internal chamber, a movable wall dividing said chamber into opposing chambers one of which has an inlet communicating with said fluid pressurizing device and the other of which has an outlet communicating with said wheel cylinder, said housing having a passageway therein communicating said opposing chambers, said passageway being formed by a large diameter vertical bore having an upper end forming a valve seat the center of which has an opening communicating with said outlet, a ball in said bore substantially filling its cross section such that pressure flow from said inlet causes said ball to abut said valve seat and such that the weight of said ball opens said valve seat to permit slow seepage past said ball when the pressure at said inlet and outlet are substantially equalized, and a smaller diameter bore communicating the opposite end of said large diameter bore with said inlet in a manner which prevents said ball from closing off said smaller diameter bore.

3. In a hydraulic braking system having a wheel cylinder which is supplied with fluid pressure from a fluid pressurizing device: a safety device having an internal chamber, a movable wall dividing said chamber into opposing chambers one of which has an inlet communicating with said fluid pressurizing device and the other of which has an outlet communicating with said wheel cylinder, said housing having a passageway therein communicating said opposing chambers, said passageway being formed by a large diameter bore having an end forming a valve seat the center of which has an opening communicating with said outlet, a ball in said bore substantially filling its cross section such that pressure flow from said inlet causes said ball to abut said seat and such that slow seepage past said ball occurs when the pressure at said inlet and outlet are substantially equalized, and a smaller diameter bore communicating the opposite end of said large diameter bore with said inlet in a manner which prevents said ball from closing off said smaller diameter bore, the axis of said small diameter bore being parallel with and eccentric to said axis of said large diameter bore.

4. In a hydraulic braking system having a wheel cylinder which is supplied with fluid pressure from a fluid pressurizing device: a safety device having an internal chamber, a movable wall dividing said chamber into opposing chambers one of which has an inlet communicating with said fluid pressurizing device and the other of which has an outlet communicating with said wheel cylinder, said housing having a passageway therein communicating said opposing chambers, said passageway being formed by a large diameter vertical bore having an upper end forming a valve seat the center of which has an opening communicating with said outlet, a ball in said bore substantially filling its cross section such that pressure flow from said inlet causes said ball to abut said valve seat and such that the weight of said ball opens said valve seat to permit slow seepage past said ball when the pressure at said inlet and outlet are substantially equalized, and a smaller diameter bore communicating the opposite end of said large diameter bore with said inlet in a manner which prevents said ball from closing off said smaller diameter bore, the axis of said small diameter bore being parallel with and eccentric to said axis of said large diameter bore.

5. In a hydraulic braking system having a wheel cylinder which is supplied with fluid pressure from a fluid pressurizing device: a safety device having an internal chamber, a movable wall dividing said chamber into opposing chambers one of which has an inlet communicating with said fluid pressurizing device and the other of which has an outlet communicating with said wheel cylinder, said housing having a passageway therein communicating said opposing chambers, said passageway being formed by a large diameter vertical bore having an upper end forming a valve seat the center of which has an opening communicating with said outlet, a ball in said bore substantially filling its cross section such that pressure flow from said inlet causes said ball to abut said valve seat and such that the weight of said ball opens said valve seat to permit slow seepage past said ball when the pressure at said inlet and outlet are substantially equalized, and a smaller diameter bore communicating the opposite end of said large diameter bore with said inlet in a manner which prevents said ball from closing off said smaller diameter bore, the axis of said small diameter bore being parallel with and eccentric to said axis of said large diameter bore, and with one side edge of the smaller bore being coextensive with one side edge of said large diameter bore.

6. A valve housing having a passageway therein extending between an inlet and an outlet, said passageway being formed by a large diameter bore having an end forming a valve seat the center of which has an opening communicating with said outlet, a ball in said bore substantially filling its cross section such that pressure flow from said inlet causes said ball to abut said seat and such that slow seepage past said ball occurs when the pressure at said inlet and outlet are substantially equalized, and a smaller diameter bore communicating the opposite end of said large diameter bore with said inlet in a manner which prevents said ball from closing off said smaller diameter bore, the axis of said small diameter bore being parallel with and eccentric to said axis of said large diameter bore, and with one side edge of the smaller bore being coextensive with one side edge of said large diameter bore.

7. A valve housing having a passageway therein extending between an inlet and an outlet, said passageway being formed by a large diameter vertical bore having an upper end forming a valve seat the center of which has an opening communicating with said outlet, a ball in said bore substantially filling its cross section such that pressure flow from said inlet causes said ball to abut said valve seat and such that the weight of said ball opens said valve seat to permit slow seepage past said ball when the pressure at said inlet and outlet are substantially equalized, and a smaller diameter bore communicating the opposite end of said large diameter bore with said inlet in a manner which prevents said ball from closing off said smaller diameter bore, the axis of said small diameter bore being parallel with and eccentric to said axis of said large diameter bore, and with one side edge of the smaller bore being coextensive with one side edge of said large diameter bore.

References Cited in the file of this patent

UNITED STATES PATENTS

| | | |
|---|---|---|
| 924,207 | Wilson | June 8, 1909 |
| 2,054,900 | Friedmann | Sept. 22, 1936 |
| 2,390,749 | Swift | Dec. 11, 1945 |
| 2,615,676 | Newbauer | Oct. 28, 1952 |
| 2,669,843 | Broadway | Feb. 23, 1954 |
| 2,921,440 | Feibush | Jan. 19, 1960 |

FOREIGN PATENTS

| | | |
|---|---|---|
| 1,047,916 | France | July 29, 1953 |